US007761551B2

(12) United States Patent
Thieringer

(10) Patent No.: US 7,761,551 B2
(45) Date of Patent: Jul. 20, 2010

(54) SYSTEM AND METHOD FOR SECURE REMOTE ACCESS

(75) Inventor: Rainer Thieringer, Boesingen (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 217 days.

(21) Appl. No.: 11/876,350

(22) Filed: Oct. 22, 2007

(65) Prior Publication Data

US 2008/0091794 A1    Apr. 17, 2008

Related U.S. Application Data

(63) Continuation of application No. PCT/EP2006/003611, filed on Apr. 6, 2006.

(30) Foreign Application Priority Data

Apr. 22, 2005    (EP) .................................. 05008877

(51) Int. Cl.
    *G06F 15/173* (2006.01)
(52) U.S. Cl. ..................... 709/223; 709/203; 709/217
(58) Field of Classification Search ................. 709/223, 709/224, 203, 217, 219
    See application file for complete search history.

(56) References Cited

U.S. PATENT DOCUMENTS

| 6,189,096 | B1 * | 2/2001 | Haverty ........................ 713/155 |
| 6,560,235 | B1   | 5/2003 | Jones |
| 6,631,417 | B1 * | 10/2003 | Balabine ..................... 709/229 |
| 6,892,225 | B1 * | 5/2005 | Tu et al. ...................... 709/217 |
| 7,197,550 | B2 * | 3/2007 | Cheline et al. ............... 709/223 |
| 7,500,236 | B2 * | 3/2009 | Janzen ........................ 717/174 |
| 7,552,213 | B2 * | 6/2009 | De Oliveira et al. ......... 709/224 |
| 7,590,744 | B2 * | 9/2009 | Richardson et al. ......... 709/227 |
| 2004/0088448 | A1 | 5/2004 | Joshi et al. |
| 2004/0255017 | A1 | 12/2004 | Jurisch et al. |
| 2005/0289226 | A1 * | 12/2005 | Mohammed et al. ........ 709/208 |
| 2006/0168149 | A1 * | 7/2006 | Dispensa ..................... 709/219 |
| 2006/0218267 | A1 * | 9/2006 | Khan et al. .................. 709/224 |
| 2007/0061460 | A1 * | 3/2007 | Khan et al. .................. 709/225 |
| 2007/0143837 | A1 * | 6/2007 | Azeez et al. ................... 726/11 |
| 2007/0198656 | A1 * | 8/2007 | Mazzaferri et al. .......... 709/218 |
| 2007/0288598 | A1 * | 12/2007 | Edeker et al. ............... 709/217 |
| 2008/0077979 | A1 * | 3/2008 | Jeffries et al. ................... 726/6 |
| 2008/0301794 | A1 * | 12/2008 | Lee ............................... 726/11 |
| 2009/0077363 | A1 * | 3/2009 | Janzen .......................... 713/1 |

OTHER PUBLICATIONS

English Translation of Search report from corresponding PCT application serial No. PCT/EP2006/003611, mailed Jul. 6, 2006, 7 pages.
Kamouskis, S., "Supporting Nomadic Users within Virtual Private Networks", Service Portability and Virtual Customer Environments, Dec. 1, 2000, IEEE, San Francisco, CA, pp. 128-133.

(Continued)

*Primary Examiner*—Lashonda T Jacobs
(74) *Attorney, Agent, or Firm*—Fish & Richardson P.C.

(57) ABSTRACT

A system provides for remote communication between a service computer and a machine control at a machine. The system includes at least one central computer that is protected by a Firewall, a connection between the service computer and the central computer, and communication connections that are allocated to each of the machine controls. The at least one central computer includes a plurality of virtual computers. Each communication connection is associated with a virtual computer. The central computer can be connected to a particular machine control through the virtual computer that is set up for the communication connection allocated to the particular machine control.

25 Claims, 2 Drawing Sheets

OTHER PUBLICATIONS

Rooney et al., "The Tempest: A Framework for Safe, Resource-Assured, Programmable Networks", IEEE Communications Magazine, New Jersey, Oct. 10, 1998, pp. 42-53.

Search report from corresponding PCT application serial No. PCT/EP2006/003611, mailed Jul. 6, 2006, 8 pages.

* cited by examiner

SYSTEM AND METHOD FOR SECURE REMOTE ACCESS

CROSS REFERENCE TO RELATED APPLICATION

This application is a continuation of and claims priority under 35 U.S.C. §120 to PCT/EP2006/003611, filed on Apr. 20, 2006, and designating the U.S., which claims priority under 35 U.S.C. §119 to European Patent Application No. 05 008 877.2, filed on Apr. 22, 2005. The contents of both the prior applications are hereby incorporated by reference in their entirety.

TECHNICAL FIELD

The description relates to a system and a method for remote communication between a service personal computer and a machine control.

BACKGROUND

Due to the global orientation of modern mechanical engineering companies having customers and machine users all over the world, it is helpful to provide maintenance, error diagnosis and, if necessary, also repair of the delivered machines, systems and devices (combined in the term "machines" below) not only directly on site, but also via remote access. Mainly large companies extend their Firewall gateways to virtual private network (VPN) portals through which the suppliers and system manufacturers can gain remote access to the delivered machines. In this connection, the suppliers and system manufacturers remove the local modems and ISDN accesses provided in their machines and systems. Some companies have defined access specifications that are not standardized. In addition to VPN, diverse other authentication methods are used, e.g., Caller-ID, Preshared Keys, One Time Password, or SecureID, or special hardware can be used.

Remote access using VPN sets high standards for the infrastructure and security. Remote access using VPN depends on the technology used by the machine user.

SUMMARY

In one general aspect, a system provides for remote communication between a service computer and a machine control at a machine. The system includes at least one central computer that is protected by a Firewall, a connection between the service computer and the central computer, and communication connections that are allocated to each of the machine controls. The at least one central computer includes a plurality of virtual computers. Each communication connection is associated with a virtual computer. The central computer can be connected to a particular machine control through the virtual computer that is set up for the communication connection allocated to the particular machine control.

Implementations can include one or more of the following features. For example, the connection between the service computer and the central computer can be configured to only permit transmission of pixel information, mouse movements, and keyboard movements. The connection between the service computer and the central computer can be realized using remote desktop protocol (RDP). The connection between the service computer and the central computer can be realized using Windows Terminal Services.

The central computer can be connected to the Intranet of the manufacturer of the machine or to the Intranet of a service operator through the Firewall, and the Intranet of the machine manufacturer or of the service operator can be connected to the Internet through another Firewall.

The allocation between the machine controls and their respective communication connections can be stored in the central computer or in a database connected to the central computer.

The communication connection between the central computer and the respective machine control can include a connection through the Internet. The communication connection between the central computer and the respective machine control can include a connection through a VPN connection.

The connection between the service computer and the central computer can include a connection through the Intranet of the machine manufacturer or of a service operator.

The connection between the service computer and the central computer can include a connection through the Internet. The connection between the service computer and the central computer can include a connection through a VPN connection.

The virtual computers of the central computer can have different applications, where such applications include one or more of operating systems, application programs, and virus protection programs. The one or more of the application programs can serve to establish the communication connection between the central computer and the machine control.

The communication connections between the virtual computers and the machine control can be identical to each other or can be different from each other.

The virtual computers can be operated simultaneously or asynchronously.

In another general aspect, a remote communication method is performed between a service computer and a machine control for a machine. The method includes protecting a central computer with a Firewall, establishing a connection between the service computer and the central computer, determining a communication connection allocated to the desired machine control, selecting a virtual computer from a plurality of virtual computers at the central computer, and starting the selected virtual computer. The virtual computer can be selected by selecting the virtual computer that is set up for the communication connection determined to be allocated to the machine control such that the communication connection links the desired machine control to the selected virtual computer.

Implementations can include one or more of the following features. For example, connection between the service computer and the central computer can be configured to permit only transmission of pixel information, mouse movements, and keyboard movements.

The method can further include enabling a user at the service computer to perform functions at the machine control through the communication connection. The method can also include enabling a user at the service computer to exchange data between the machine control and the central computer. The method can also include connecting the central computer to the Intranet associated with the machine through the Firewall and/or connecting the machine Intranet to the Internet through another Firewall.

Determining the communication connection allocated to the desired machine control can include determining based on data stored in the central computer.

The communication connection can include a VPN connection or the Internet.

Establishing the connection between the service computer and the central computer can include establishing a connection through the Internet or through a VPN connection.

In another general aspect, a system is configured for remote communication between a service computer and a machine control at a machine. The system includes at least one central computer that is protected by a Firewall, a connection between the service computer and the central computer, communication connections that are allocated to each of the machine controls, and a plurality of virtual computers within the at least one central computer. The virtual computers are configured to be run simultaneously and each virtual computer is set up for an associated communication connection. The central computer is configured to be connected to a particular machine control through the virtual computer that is set up for the communication connection allocated to the particular machine control.

Implementations can include one or more of the following features. For example, the virtual computers can be configured to be run asynchronously.

The system provides for secure remote access to machine, device, or system controls (combined in the term "machine control" below), which prevents transmission of viruses and permits access using the most different dialing-up and encoding technologies.

This object is achieved in accordance with the invention by a system for remote communication between a service computer and a machine control with at least one central computer, which is protected by a Firewall and includes several virtual computers that can be run simultaneously, and that are each set up for the same or different types of communication connections to machine controls, wherein the service computer can be connected to the central computer, and wherein the central computer can be connected to a machine control via that virtual computer which is set up for the communication connection allocated to that machine control.

The remote communication system or portal enables central installation of customer data and access technologies for remote access to machines. Heterogeneous dial-up technologies can be installed simultaneously on the virtual computers. This technology moreover provides a high security standard for sensitive customer data (dial-up numbers, passwords, etc.), since only specific persons have access to the structure behind the Firewall. There are different servers for data management, authentication, licenses, network services, and the Firewall on the protected central computer or on the protected network.

The connection, through which the service computer can be connected to the central computer or computer network, advantageously only permits transmission of pixel information, mouse movements, and keyboard movements, such that transmission of viruses between the service computer and the central computer is prevented. With particular preference, the connection between the service computer and the central computer or computer network is realized via remote desktop programs, e.g., via RDP or VNC and, in particular, using Windows Terminal Services. Towards this end, the central computer can include at least one terminal server.

The remote communication system can be arbitrarily scaled, such that a number of remote access sessions can be performed, and the number of access sessions is limited only by the number of communication connections that can be established at the same time. Authorized persons can start a terminal session on the terminal server, and thereby obtain a virtual screen of the terminal server in the protected zone. The user selects a machine from a list on the basis of its equipment number, and a virtual computer ("virtual machine"), which is set up for the selected machine user (customer) or a customer group, is booted on the terminal server using this data. A connection is established with this virtual computer via the dial-up technology preset by the machine user. It is thereby possible to realize the different dial-up techniques that a customer may use, e.g., a VPN connection, pcAnywhere via a DOS computer, pcAnywhere via any Windows, direct dial-up with pcAnywhere, RAS connection via TCP/IP, or also exotic connections, such as, e.g., via Linux. All virtual computers can be easily archived by copying files, such that service can always be provided with a virtual computer that is specially set up for each customer. External companies can also be given authorization to access the remote communication system, such that a sub-supplier can obtain dial-up authorization for specific devices. Any access to devices can be recorded.

The central computer can be connected to the Intranet of the machine manufacturer or a service operator through the Firewall, and the Intranet of the machine manufacturer can be connected to the Internet through another Firewall. The authenticated user does not have to log in directly on the Intranet of the machine manufacturer or service operator, but can, e.g., be logged in on the Intranet through a VPN connection, a ISDN or the Internet, or any service computer. There is no direct network connection between the service computer of the user and the customer network (connected to the machine control) but only between the protected central computer and the machine control of a machine at the customer's location.

The allocation between the machine controls and their respective communication connections is, e.g., stored in the central computer or in a database connected to the central computer or within the central computer.

The communication connection between the central computer and the respective machine control and the connection between the service computer and the central computer can be realized through the Internet, for example, through one VPN connection in each case.

The virtual computers of the central computer can have different operating systems and/or different application programs and/or different virus protection programs. The communication connection between the central computer and the machine control is thereby provided by one or more application programs.

A remote communication method can be performed between a service computer and a machine control. A user establishes a connection between his/her service computer and a central computer, which is protected by a Firewall, The connection only permits transmission of pixel information, mouse and keyboard movements. The central computer determines a communication connection allocated to the desired machine control on the basis of the stored data, and selects, from its plurality of virtual computers, one virtual computer that is set up for this communication connection to be connected to the machine control, and the central computer starts this virtual computer.

The user can carry out functions of the machine control by way of the communication connection and/or exchanges files between the machine control and the central computer.

Further advantages of the invention can be extracted from the description and the drawings. The features mentioned above and below may be used individually or collectively in arbitrary combination. The embodiments shown and described are not to be understood as exhaustive enumeration but have exemplary character for describing the invention.

DETAILED DESCRIPTION

Figure 1:
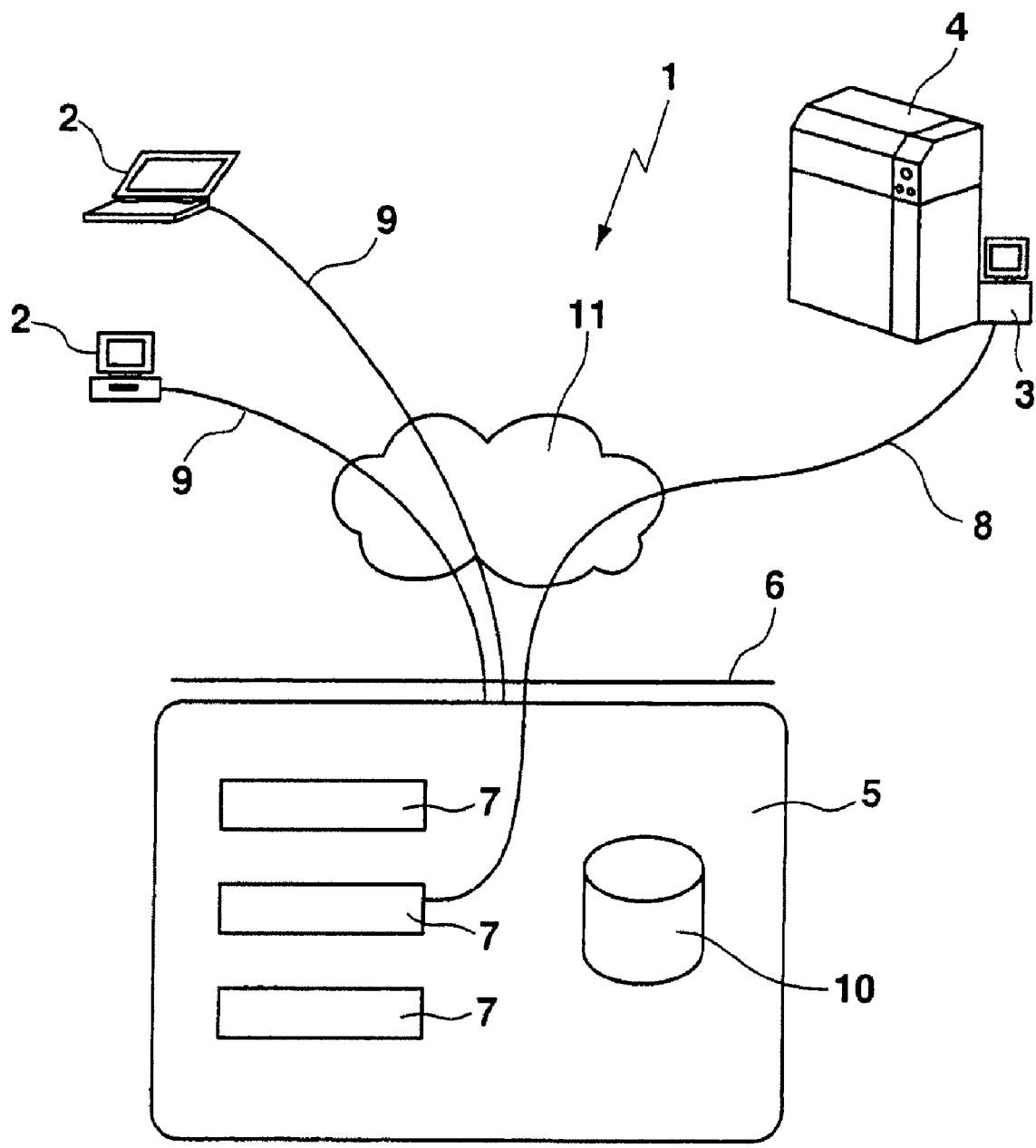
FIG. 1 is a schematic diagram of a remote communication system between a service computer and a machine control in which a central computer is interconnected.

The system 1 shown in FIG. 1 serves for remote communication between a service PC 2 (operated by a user) and a machine control 3 of a machine, a device 4, or a system (e.g., a machine tool or a laser device) to enable maintenance, error diagnosis, and, if necessary, repair of the machine 4 by enabling remote access to information about the machine 4 at the service PC 2. The system 1 prevents the transmission of viruses between the service PC 2 and the machine control 3 while enabling access to the machine control 3.

The system 1 includes at least one central computer 5 that is protected from the outside by a Firewall 6 and that has several virtual computers ("virtual machine") 7 that can be run simultaneously or asynchronously. These individual virtual computers 7 are provided with machine controls for the same or different types of communication connections 8, as explained in more detail below.

The service PC 2 is connected to the central computer (which can be part of a computer network) 5 through a connection 9 that permits, for example, only transmission of pixel information, mouse movements, and/or keyboard movements. The connection between the service PC 2 and the central computer 5 can be made using remote desktop programs, for example, using remote desktop protocol (RDP) or using virtual network computing (VNC). In one implementation, the connection can be made using Windows Terminal Services (a component of Microsoft Windows), in which case, the central computer 5 can include at least one Terminal Server. The remote communication system 1 can be arbitrarily scaled such that a number of remote access sessions can be performed, where the number of access sessions is limited only by the number of communication connections that can be established at the same time. Authorized persons can start a terminal session on the Terminal Server, and thereby obtain a virtual screen of the Terminal Server in a protected zone. The user at the service PC 2 selects a machine 4 (for a particular customer or customer group) from a list provided to the user at the service PC 2 on the basis of the machine's equipment number, and a virtual computer 7 is selected that corresponds to the selected machine 4. The virtual computer 7 is booted on the Terminal Server.

The central computer 5 is connected to the machine control 3 by way of the virtual computer 7 that is set up for the communication connection 8 allocated to the machine control 3. The connection between the virtual computer 7 and the machine control 3 is established using the dial-up technology preset by the user at the machine 4. Thus, the system 1 can be used with the various different technologies that can be present at the machine 4, for example, a VPN connection, a pcAnywhere via a DOS computer, pcAnywhere via any Windows, direct dial-up with pcAnywhere, RAS connection via TCP/IP, or exotic connections such as, e.g., connections using Linux. Each virtual computer 7 can be archived by copying files to the database 10. Thus, service can always be provided with a virtual computer 7 that is specifically set up for each customer (at each machine 4). Moreover, external companies (that is, external to the customer, for example, a sub-supplier) can be given authorization to access the system 1 such that the sub-supplier can obtain dial-up authorization for specific machines 4. Access to specific machines 4 can be recorded.

The allocation of the machine controls 3 to their respective communication connections 8 is stored in the central computer, for example, in a database 10 that can be within the central computer 5 or connected to the central computer 5. The virtual computers 7 of the central computer 5 have different operating systems with different application programs to establish the communication connection 8 between the central computer 5 and the different machine controls 3. Additionally or alternatively, the virtual computers 7 can have different virus protection programs. The connection 9 between the service PC 2 and the central computer 5 and the connection 8 between the central computer 5 and the respective machine control 3 is realized by way of the Internet 11, in each case by a VPN connection.

For remote access to the machine control 3 of a specific machine, the user initially establishes the connection 9 between his or her service PC 2 and the central computer 5 protected by the Firewall 6. The central computer 5 determines the communication connection 8 allocated to the desired machine control 3 on the basis of the data stored in the database 10, and selects that virtual computer 7 that is set up for this communication connection 8 to be connected to the machine control 3, and starts the selected virtual computer 7. The user carries out functions of the machine control 3 by way of the communication connection 8 and/or exchanges files between the machine control 3 and the central computer 5. In this way, the machine control 3 of a machine at the customer's location is not directly connected to the service PC 2, but only connected indirectly through the protected central computer 5.

Figure 2:
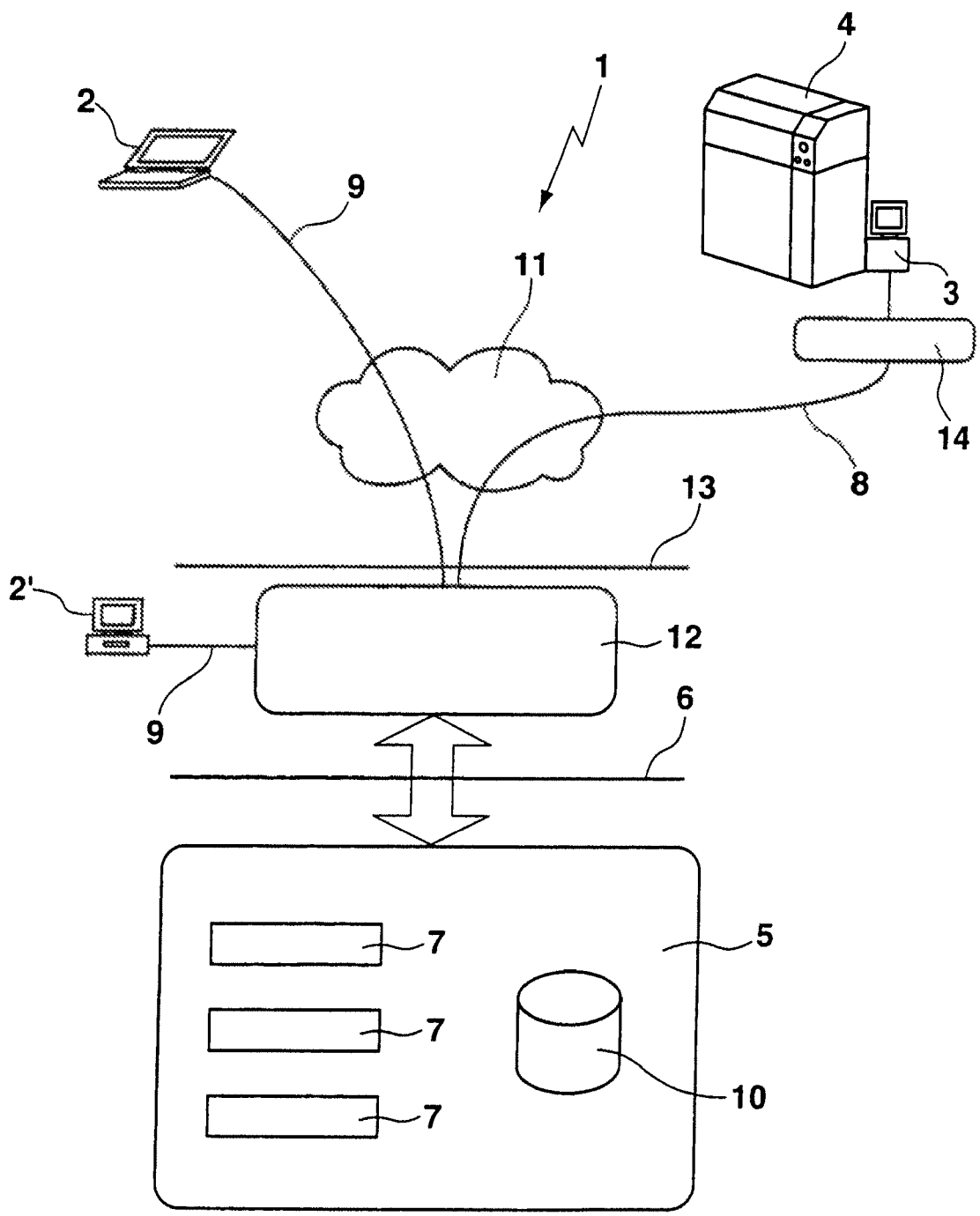
FIG. 2 is a schematic diagram of the remote communication system of FIG. 1, in which the central computer is connected to the Intranet of the machine manufacturer, and the machine control is connected to the Intranet of the machine user.

In FIG. 2, the central computer 5 is connected to an Intranet (in-house network) 12 of the machine manufacturer through the Firewall 6, and the Intranet 12 is connected to the Internet 11 through another Firewall 13. The authenticated user does not need to log in directly on the Intranet 12 of the machine manufacturer but can, for example, be logged in on the Intranet through a VPN connection, through an ISDN or the Internet, or through any service PC 2, 2'. There is no direct network connection between the service PC 2, 2' of the user and the customer network (which can be accessed at the machine control 3); rather, there is a connection between the protected central computer 5 and the machine control 3 of the machine 4 at the customer's location.

The machine control 3 is connected to the Intranet (in-house network) 14 of the machine user, and the Intranet is also connected to the Internet 11. The central computer 5 is a protected LAN area (VLAN) that is separated from the Intranet 12 of the machine manufacturer by way of the Firewall 6. Only specific persons have access to the structure behind the Firewall 6. The service PCs 2, 2' are connected to the central computer 5 either directly through the Intranet 12 of the machine manufacturer or through the Internet 11.

What is claimed is:

1. A system for remote communication between a service computer and a machine control at a machine, the system comprising:

at least one central computer that is protected by a Firewall, wherein the at least one central computer comprises a plurality of virtual computers that are configured to be run simultaneously, a connection between the service computer and the central computer, and communication connections that are allocated to each of the machine controls, where each communication connection is associated with a virtual computer, wherein the central computer is configured to be connected to a particular machine control through the virtual computer that is set up for the communication connection allocated to the particular machine control.

2. The system of claim 1, wherein the connection between the service computer and the central computer only permits transmission of pixel information, mouse movements, and keyboard movements.

3. The system of claim 1, wherein the connection between the service computer and the central computer is realized using remote desktop protocol (RDP).

4. The system of claim 3, wherein the connection between the service computer and the central computer is realized using Windows Terminal Services.

5. The system of claim 1, wherein the central computer is connected to the Intranet of the manufacturer of the machine or to the Intranet of a service operator through the Firewall, and the Intranet of the machine manufacturer or of the service operator is connected to the Internet through another Firewall.

6. The system of claim 1, wherein the allocation between the machine controls and their respective communication connections is stored in the central computer or in a database connected to the central computer.

7. The system of claim 1, wherein the communication connection between the central computer and the respective machine control includes a connection through the Internet.

8. The system of claim 7, wherein the communication connection between the central computer and the respective machine control includes a connection through a VPN connection.

9. The system of claim 1, wherein the connection between the service computer and the central computer includes a connection through the Intranet of the machine manufacturer or of a service operator.

10. The system of claim 1, wherein the connection between the service computer and the central computer includes a connection through the Internet.

11. The system of claim 10, wherein the connection between the service computer and the central computer includes a connection through a VPN connection.

12. The system of claim 1, wherein the virtual computers of the central computer have different applications, where such applications includes one or more of operating systems, application programs, and virus protection programs.

13. The system of claim 12, wherein the one or more of the application programs serve to establish the communication connection between the central computer and the machine control.

14. The system of claim 1, wherein the communication connections between the virtual computers and the machine control are identical.

15. The system of claim 1, wherein the communication connections between the virtual computers and the machine control are different from each other.

16. The system of claim 1, wherein the virtual computers can be operated simultaneously.

17. A remote communication method between a service computer and a machine control for a machine, the method comprising:

protecting a central computer with a Firewall;

establishing a connection between the service computer and the central computer, determining a communication connection allocated to the desired machine control, selecting a virtual computer from a plurality of virtual computers at the central computer, wherein selecting the virtual computer includes selecting the virtual computer that is set up for the communication connection determined to be allocated to the machine control such that the communication connection links the desired machine control to the selected virtual computer, and starting the selected virtual computer.

18. The method of claim 17, wherein the connection between the service computer and the central computer permits only transmission of pixel information, mouse movements, and keyboard movements.

19. The method of claim 17, further comprising enabling a user at the service computer to perform functions at the machine control through the communication connection.

20. The method of claim 17, further comprising enabling a user at the service computer to exchange data between the machine control and the central computer.

21. The method of claim 17, further comprising connecting the central computer to the Intranet associated with the machine through the Firewall.

22. The method of claim 21, further comprising connecting the machine Intranet to the Internet through another Firewall.

23. The method of claim 17, wherein determining the communication connection allocated to the desired machine control includes determining based on data stored in the central computer.

24. The method of claim 17, wherein the communication connection includes a VPN connection or the Internet.

25. A system for remote communication between a service computer and a machine control at a machine, the system comprising:

at least one central computer that is protected by a Firewall, a connection between the service computer and the central computer, communication connections that are allocated to each of the machine controls, and a plurality of virtual computers within the at least one central computer, where the virtual computers are configured to be run simultaneously and each virtual computer is set up for an associated communication connection, wherein the central computer is configured to be connected to a particular machine control through the virtual computer that is set up for the communication connection allocated to the particular machine control.

* * * * *

UNITED STATES PATENT AND TRADEMARK OFFICE
CERTIFICATE OF CORRECTION

| | | |
|---|---|---|
| PATENT NO. | : 7,761,551 B2 | Page 1 of 1 |
| APPLICATION NO. | : 11/876350 | |
| DATED | : July 20, 2010 | |
| INVENTOR(S) | : Rainer Thieringer | |

It is certified that error appears in the above-identified patent and that said Letters Patent is hereby corrected as shown below:

On the title page, column 1, item [63] after "Continuation of application No. PCT/EP2006/003611, filed on" delete "April 6, 2006" and insert --April 20, 2006--.

Signed and Sealed this
Nineteenth Day of April, 2011

David J. Kappos
*Director of the United States Patent and Trademark Office*